United States Patent
Meulendijks et al.

(10) Patent No.: US 10,631,565 B2
(45) Date of Patent: Apr. 28, 2020

(54) ROTARY CYLINDRICAL MOULD MEMBER AND A METHOD FOR MANUFACTURING A ROTARY CYLINDRICAL MOULD MEMBER FOR MOULDING FOOD PRODUCTS SUITABLE FOR CONSUMPTION

(71) Applicant: MAREL FURTHER PROCESSING B.V., Boxmeer (NL)

(72) Inventors: Johannes Martinus Meulendijks, Deurne (NL); Dirk Meskendahl, Kranenburg (NL); Charles Johannes Maria Geurts, Arcen (NL); Matheus Martinus Maria Van Der Horst, Vortum-Mullem (NL); Martinus Johannes Willebrordus Van Zoelen, 's-Hertogenbosch (NL)

(73) Assignee: MAREL FURTHER PROCESSING B.V., Boxmeer (NL)

( * ) Notice: Subject to any disclaimer, the term of this patent is extended or adjusted under 35 U.S.C. 154(b) by 0 days.

(21) Appl. No.: 16/326,072

(22) PCT Filed: Aug. 17, 2017

(86) PCT No.: PCT/NL2017/050542
§ 371 (c)(1),
(2) Date: Feb. 15, 2019

(87) PCT Pub. No.: WO2018/034568
PCT Pub. Date: Feb. 22, 2018

(65) Prior Publication Data
US 2019/0183162 A1     Jun. 20, 2019

(30) Foreign Application Priority Data
Aug. 19, 2016  (NL) .................................. 2017337

(51) Int. Cl.
A22C 7/00        (2006.01)
A23P 30/10       (2016.01)

(52) U.S. Cl.
CPC ............ *A23P 30/10* (2016.08); *A22C 7/0038* (2013.01); *A22C 7/0069* (2013.01)

(58) Field of Classification Search
CPC ...... A22C 7/0038; A22C 7/0069; A23P 30/10
See application file for complete search history.

(56) References Cited

U.S. PATENT DOCUMENTS 7,976,303 B2 *  7/2011  van der Eerden ... A22C 7/0069
                                                    425/241
9,730,467 B2 *  8/2017  Van Gerwen ........ A22C 7/0038
(Continued)

FOREIGN PATENT DOCUMENTS

EP       2 064 956 A1    6/2009
WO    WO 2004/002229 A2   1/2004
(Continued)

OTHER PUBLICATIONS

International Search Report (PCT/ISA/210) issued in PCT/NL2017/050542, dated Nov. 8, 2017.
(Continued)

*Primary Examiner* — James P Mackey
(74) *Attorney, Agent, or Firm* — Birch, Stewart, Kolasch & Birch, LLP (57) ABSTRACT

The present invention relates to a rotary cylindrical mould member and a method for manufacturing a rotary cylindrical mould member for moulding food products suitable for consumption. One or more recessed mould cavities (21) are formed in an curved outer surface (22c) of at least one porous mould body (22), defining the shape of the products which are to be produced. An airflow-resistive skin layer is formed by plastic deformation of a cavity surface layer, (Continued)

having a first flow resistance. An inner volume of the porous mould body (22) between an inner surface (22i) and the airflow-resistive skin layer has a porous structure with a second flow resistance to a compressed air flow through the porous inner volume, wherein according to the invention the first flow resistance is essentially the same as the second flow resistance.

13 Claims, 7 Drawing Sheets

(56) References Cited

U.S. PATENT DOCUMENTS 10,028,515 B2 * 7/2018 Boom .................. A22C 7/0069
10,182,575 B2 * 1/2019 Van Gerwen ........ A22C 7/0069

FOREIGN PATENT DOCUMENTS

WO    WO 2012/107236 A2    6/2012
WO    WO 2014/118368 A2    8/2014
WO    WO 2016/003279 A1    1/2016

OTHER PUBLICATIONS

Written Opinion (PCT/ISA/237) issued in PCT/NL2017/050542, dated Nov. 8, 2017.

* cited by examiner

ROTARY CYLINDRICAL MOULD MEMBER AND A METHOD FOR MANUFACTURING A ROTARY CYLINDRICAL MOULD MEMBER FOR MOULDING FOOD PRODUCTS SUITABLE FOR CONSUMPTION

FIELD OF THE INVENTION

The present invention relates to a rotary cylindrical mould member and a method for manufacturing a rotary cylindrical mould member for moulding food products suitable for consumption.

BACKGROUND OF THE INVENTION

Rotary cylindrical mould members for moulding food products are well known in the art and commercially applied by Marel in the RevoPortioner since the late 1990's. Such a rotary cylindrical mould member is adapted to be used in a system for moulding food products from a mass of one or more food starting materials, the cylindrical mould member having a longitudinal axis and a peripheral cylindrical outer surface. The rotary cylindrical mould member comprises at least one porous mould body having a curved outer surface, forming at least part of the cylindrical outer surface of the mould member, and an opposite inner surface, which mould body is made at least partially from a homogeneous porous material, with a porous structure of intercommunicating pores opening out at the inner surface of the mould body.

The porous mould body comprises a curved outer surface which is sealed airtight; and one or more recessed mould cavities formed in the curved outer surface of the mould body, defining the shape of the products which are to be produced, the mould cavities being open in the outer surface of the mould body to allow for the filling of the mould cavity with a mass of one or more food starting materials. An open-pored cavity surface area defines the mould cavity in the known embodiments.

The rotary cylindrical mould member further comprises one or more air channels extending from an air inlet, adapted to provide communication from the air inlet via the air channel and via the porous structure of the porous mould body between the air channel and the open-pored cavity surface area into the mould cavities to assist in the removal of product from a mould cavity.

As indicated in WO2004/002229, the provision of mould cavities in a porous body by means of milling causes plastic deformation of the porous sintered stainless steel in a layer bounding the mould cavity, which generally causes the openings of the pores which open out at the surface to be completely closed up. In a subsequent manufacturing step at least part of the deformed cavity surface layer is treated by removing the deformed layer in its entirety, such that the pore openings are at the surface and thereby create an open-pored cavity surface area. In WO2004/002229, spark erosion is mentioned as a technique to cause the porous structure of the deformed cavity surface layer to be opened up again. Spark erosion, also referred to as electrical discharge machining (EDM), die sinking, wire burning or wire erosion, is a manufacturing process whereby material is removed from the workpiece by a series of rapidly recurring current discharges (sparks) between two electrodes, separated by a dielectric liquid and subject to an electric voltage. A known alternative technique to treat at least part of the closed pores at the surface is polishing, e.g. mechanically or chemically. A specific technique is electropolishing, also known as electrochemical polishing or electrolytic polishing, which is an electrochemical process that removes material from a metallic workpiece. It is used to polish, passivate, and deburr metal parts.

In the known techniques to treat at least part of the plastically deformed cavity surface layer, in which the openings of the pores which open out at the surface are substantially completely closed up, the plastically deformed cavity surface layer is essentially removed so as to expose the porous structure of the porous inner volume. By removing the skin layer formed by plastic deformation, the inner volume having a porous structure is exposed.

The regained porous structure and open-pored cavity surface layer bounding the cavity allows the removal of the food product from the one or more mould cavities by feeding compressed air from the air inlet via the air channel and via the porous structure of the mould body into the mould cavities.

Practical use of embodiments of the described rotary mould members, in particular when making food products out of ground red meat, experience undesired build-up of fat in the mould cavities, such that intermediate cleaning, e.g. by water jets, is required, for example every half hour, in particular frequently intermediate a shift of 16 hours. It is commonly desired to have a production time a shift of 16 hours prior to cleaning a mould drum overnight.

Object of the Invention

It is an aim of the present invention to provide an improved cavity surface layer preventing or reducing fat build-up and being effective in the removal of product from a mould cavity, as well as an alternative method for manufacturing a rotary cylindrical mould member, wherein such an alternative cavity surface layer is obtained.

SUMMARY OF THE INVENTION

This aim is obtained according to claim 1, relating to a rotary cylindrical mould member, which is adapted to be used in a system for moulding products from a mass of one or more food starting materials, the cylindrical mould member having a longitudinal axis and a peripheral cylindrical outer surface, comprising at least one porous mould body having a curved outer surface, forming at least part of the cylindrical outer surface of the mould member, and an opposite inner surface, which mould body is made at least partially from a homogeneous porous material, with a porous structure of intercommunicating pores opening out at the inner surface of the mould body, the porous mould body comprising:
 a curved outer surface, which is sealed airtight;
 one or more recessed mould cavities formed in the curved outer surface of the mould body, defining the shape of the products which are to be produced, the mould cavities being open in the outer surface of the mould body to allow for the filling of the mould cavity with a mass of one or more food starting materials; and
 an airflow-resistive skin layer formed by plastic deformation of a cavity surface layer defining the mould cavity, having a first flow resistance to a compressed air flow through the airflow-resistive skin layer;
 an inner volume of the porous mould body between the inner surface and the airflow-resistive skin layer having a porous structure with a second flow resistance to a compressed air flow through the porous inner volume;
the rotary cylindrical mould member further comprising one or more air channels extending from an air inlet, adapted to provide communication from the air inlet via the air channel and via the inner volume and the airflow-resistive skin layer into the mould cavities to assist in the removal of product from a mould cavity;

wherein the first flow resistance is essentially the same as the second flow resistance.

This aim is further achieved by a method for manufacturing a rotary cylindrical mould member, which is adapted to be used in a system for moulding products from a mass of one or more food starting materials, the cylindrical mould member having a longitudinal axis and a peripheral cylindrical outer surface, the method of manufacturing comprising the steps of:

providing at least one porous mould body having a curved outer surface, forming at least part of the cylindrical outer surface of the mould member, and an opposite inner surface, which mould body is made at least partially from a homogeneous porous material, with a porous structure of intercommunicating pores opening out at the inner surface of the mould body, sealing the curved outer surface of the body airtight;

forming one or more recessed mould cavities in the curved outer surface of the mould body, defining the shape of the products which are to be produced, the mould cavities being open in the outer surface of the mould body to allow for the filling of the mould cavity with a mass of one or more food starting materials, thereby plastically deforming a cavity surface layer defining the mould cavity, so as to produce an airflow-resistive skin layer, having a first flow resistance to a compressed air flow through the airflow-resistive skin layer, and thereby defining an inner volume of the porous mould body between the inner surface and the airflow-resistive skin layer having a porous structure with a second flow resistance to a compressed air flow through the porous inner volume;

preparing one or more air channels, extending from an air inlet, adapted to provide communication from the air inlet via the air channel and via inner volume of the porous mould body between the air channel and the airflow-resistive skin layer into the mould cavities to assist in the removal of product from a mould cavity;

wherein the first flow resistance is essentially the same as the second flow resistance.

According to the present invention, an airflow-resistive skin layer is formed by plastic deformation of said porous material of the cavity surface layer defining the mould cavity, having a first flow resistance to a compressed air flow through the airflow-resistive skin layer. An inner volume of the porous mould body between the air channel and the airflow-resistive skin layer has a porous structure with a second flow resistance to a compressed air flow through the porous inner volume. The first flow resistance is essentially the same as the second flow resistance.

Having a relatively large inner volume with essentially the same flow resistance to a compressed air flow as the thin airflow-resistive skin layer results in a configuration in which pressure build-up of compressed air occurs, which has shown to be advantageous in view of the removal of product, as fat build-up is significantly diminished and possibly even prevented. Typically, the airflow-resistive skin layer has a thickness of 10-200 µm, in particular between 30-80 µm, and the inner volume has a thickness of 3-20 mm, in particular between 5-15 mm. The porosity of the mould body, and hence that of the porous inner volume, is typically between 3-30%, advantageously between 5-15%, having pores with an effective pore size of 1-50 µm.

The flow resistance to a compressed air flow, according to the invention, is essentially the same in the inner volume and in the airflow-resistive skin layer. "Essentially the same" is to be interpreted as within a range+/−25%, hence, the ratio between the flow rate resistance of the airflow-resistive skin layer and the inner volume may vary between 1:0,75-1,25. It is further noticed that "the" flow resistance is to be interpreted as an average flow resistance. In particular in in the inner volume, the length of the air path from an air channel to the airflow-resistive skin layer may be variable.

The thus obtained airflow-resistive skin layer provides an alternative to the known open-pored cavity surface area, i.e. the regained totally open porous structure. For some food starting materials, the thus obtained plastically deformed cavity surface layer allows an improved removal of the food product from the one or more mould cavities by feeding pressurized air via the porous structure and the cavity surface layer into the mould cavities. Such an improved product removal has been experienced for food products from a fat-containing meat mass, such as certain types of red meat.

The combination of porous inner volume and airflow-resistive skin layer of the invention is not only suitable for product removal by compressed air, but advantageously also allows the creation of a fluid film between the food product and the mould cavity. Furthermore, the structure of the invention may allow a cleaning fluid to enter the mould cavity, and thus attribute to adequate cleaning of the mould cavity.

In an embodiment, the mould body comprises sintered metal, such as stainless steel, aluminum, copper or bronze. It is also conceivable to obtain the airflow-resistive skin layer from a body of porous material comprising polymers. Possibly, the body of porous material is obtained using rapid prototyping, e.g. metal or polymer 3D printing.

In embodiments, sinter powder having a particle size of 100-200 µm is applied, which has been sintered. Possible, isostatic pressing and/or coaxial compression is applied to produce a mould body having a porous inner volume. Typically, such a product comprises a porosity of 3-30%, preferably between 5-15%.

A mould cavity can be formed in a single step, or in subsequent steps. Possible production techniques include milling, drilling, spark erosion, grinding. Possibly different tools or settings are used for final shaping the mould cavity, e.g. via shot peening media blasting, laser drilling, or by using a different type of (end) mill, or a different rotational speed.

It is conceivable that the airflow-resistive skin layer of the invention is obtained in a single step, during the forming of the mould cavities. This is possible by choosing a proper combination of technique and tools. For example, it is conceivable that a final surface finish milling step is applied to provide an airflow-resistive skin layer having essentially the same flow resistance to a compressed air flow as the porous inner volume. Below the airflow-resistive skin layer the inner volume of the body of porous material comprising the original porous structure is maintained intact. This is in particular achievable using a flat bottomed end mill, instead of a ball end type end mill.

In embodiments, the mould cavity is provided prior to sintering a metal body. In such a method, the cavity surface layer is not closed or only to a very small degree during manufacturing. In such embodiments, the cavity surface layer has the same properties as the inner volume, i.e. the bulk of the cylindrical body. The airflow-resistive skin layer is to be obtained in a subsequent step or steps.

Generally, the airflow-resistive skin layer of the invention is obtained in a two-step process, comprising a machining step such as milling or spark erosion, and a polishing step such as plasmapolishing or electrochemical polishing. For example, substantially all pores are closed in the machining step, and subsequently selectively opened in the polishing step.

In an exemplary embodiment, the one or more mould cavities are provided in a milling step, in particular a rough milling step followed by a surface finish milling step, wherein the use of a milling cutter causes surface smearing of the porous sintered metal surface layer adjacent the mould cavity. It has been noticed that a setting of a milling tool having a relatively high rotational speed results in increased smearing.

Below the irregular thickness smeared cavity surface layer, the inner volume of the body of porous material comprising the original porous structure is maintained intact.

Smearing is the plastic deformation of a surface due to sliding contact with another object. Visually, the texture of a rough surface is smeared and makes it shinier. Smearing may occur on any surface if the contact stress locally exceeds the yield strength of the material.

In embodiments, as a result of the use of particular milling cutters, an irregular thickness smeared cavity surface layer is formed having an irregular and hence variable thickness of 10-200 µm wherein substantially all pores are closed. In other words, in the surface layer portions having a thickness of 10-200 µm coexist.

In a possible embodiment, mould cavities are made using an end mill, having cutting teeth at one end, as well as on the sides. Yet alternatively only cutting teeth are provided at the end. An end mill may have a flat bottomed milling cutter, but it is also conceivable that a rounded (ball nosed) cutter is applied, or a radiused (bull nose) cutter.

Possibly, a roughing end mills is applied, utilizing a wavy tooth form cut on the periphery. These wavy teeth form many successive cutting edges producing many small chips, resulting in a relatively rough surface finish.

As an alternative, or in addition, a relatively rough surface is obtained utilizing a relatively blunt end mill.

Advantageously, mould cavities having a diameter of 40-150 mm are made using an end mill having a diameter of 3-10 mm. The use of such a relatively fine end mill to produce a relatively large mould cavity will attribute to the irregular thickness of the surface layer.

The mould cavity may have any possible shape: circular as in a hamburger, or Christmas-tree shaped (such as in potato croquettes), or irregular such as in chicken nuggets. Furthermore, the mould cavity may have a constant thickness or a variable thickness, enabling the production of three-dimensional products, e.g. comprising a thin end, or a rounded shape, or products provided with a pattern, or a doughnut-shape, etc. etc.

Hence, during the production of the mould cavity the cavity surface layer adjacent the mould cavity is plastically deformed. This layer is created adjacent the entire mould cavity, hence, at all sides thereof. In embodiments, substantially all pores are closed in the machining step.

In a subsequent polishing step, plasmapolishing or electrochemical polishing, the closed pores are selectively opened.

During elongated electrochemical polishing, the entire smeared cavity surface layer will be removed, resulting in exposure of the entire original porous structure below the smeared surface layer.

Limited electropolishing will allow only erosion of the thinnest cavity surface layer portions, instead of from the entire cavity surface layer. As a result, limited electropolishing will result in a smooth polished surface with no or few protruding parts, provided with fine holes exposing on average 2-3 pores. An airflow-resistive skin layer thus obtained has essentially the same flow resistance to a compressed air flow as the porous inner volume.

Limited electropolishing is achieved e.g. by exposing the surface for a relatively short time, or alternatively to a less concentrated electrolyte.

In embodiments with an irregular thickness smeared cavity surface layer, subsequent limited electrochemical polishing will selectively remove only minute regions of the irregular thickness smeared cavity surface and thus selectively open up pores. Thereby a airflow-resistive skin layer according to the invention is obtained having essentially the same flow resistance to a compressed air flow as the porous inner volume. Such a surface has fine holes resulting from local erosion of the thinnest cavity surface layer portions, and a smooth polished remaining surface wherein virtually all pores are closed.

According to the invention, the mould cavity is formed as a recess in the porous mould body. Said porous material comprises a cavity surface layer defining the mould cavity. The mould cavity has a cavity surface area.

For example, the fine holes open out in 1-10% of the cavity surface area and have an average hole diameter of 10-100 µm, and none of the holes having a hole diameter exceeding 200 µm. As a result hereof, only a few (1-10) pores are exposed per fine hole, on average 2-3 pores per fine hole.

During electrochemical polishing, also referred to as electropolishing, the irregular thickness smeared cavity surface layer is exposed to an electrolyte. Advantageously, the entire porous stainless steel body with mould cavities is immersed in a bath of electrolyte. By shielding the curved outer surface of the body, e.g. by a foil, the cavity surface layer is locally exposed. The metal cavity surface layer serves as an anode and is connected to a positive terminal of a DC power supply, the negative terminal being attached to the cathode. During electropolishing, a current is allowed to pass from the anode, where metal on the surface is oxidized and dissolved in the electrolyte, to the cathode. At the cathode, a reduction reaction occurs, which normally produces hydrogen. Electrolytes used for electropolishing are most often concentrated acid solutions having a high viscosity, such as mixtures of sulfuric acid and phosphoric acid. Other electropolishing electrolytes reported in the literature include mixtures of perchlorates with acetic anhydride and methanolic solutions of sulfuric acid.

In embodiments, an irregular thickness smeared cavity surface layer having an irregular thickness of 10-200 µm is produced. It is known that when a rough surface is electropolished, the protruding parts of a surface profile will dissolve faster than the recesses. This process, referred to as anodic leveling, is said to be achieved by a mass transport limited dissolution reaction. As a result, a polished surface is achieved without causing mechanical deformation of surface layers usually observed when mechanical polishing is used.

In embodiments, the body of porous material is a cylindrical tubular. Multiple mould cavities may be provided in the outer surface, e.g. arranged in rows, e.g. rows parallel to the longitudinal axis of the cylindrical tubular and/or radially parallel rows.

Yet alternatively, the body of porous material is embodied as an insert to be placed in a recess of a cylindrical tubular. In a method of the invention, a cylindrical tubular is provided with one or more recesses, and an equal amount of bodies of porous material embodied as inserts are inserted into the recesses of the cylindrical tubular. Advantageously, the one or more mould cavities are provided in the outer surface prior to inserting them into the recesses. Also electropolishing is advantageously carried out prior to inserting the bodies into the recesses.

When moulding food products suitable for consumption, it is advantageous to apply a porous sintered stainless steel mould drum, preferably a drum manufactured according to the present invention.

Possibly, fluid-tight barriers are provided between one or more mould cavities. Hence, fluid, such as compressed air, can be provided to one or more mould cavities, without affecting mould cavities at the other side of the barrier. Such a fluid-tight barrier is e.g. provided by locally impregnating the porous body with a resin.

A possible method comprises the additional step of providing a fluid-tight barrier at the outer surface of the homogeneous porous sintered stainless steel body adjacent the mould cavities. With an open outer surface, fluid provided into the porous structure may follow a fluid path to the open outer surface, having less resistance than the fluid path to the mould cavity filled with product. By providing a fluid-tight barrier at the outer surface of the homogeneous porous sintered stainless steel body adjacent the mould cavities, the fluid path to the open outer surface is closed and all fluid will be forced to the one or more mould cavities.

According to the invention, the curved outer surface of the body of porous material is sealed airtight. For example, a burnish treatment using rollers is applied, creating a sealed layer of approximately 1 mm. Other mechanical deformation techniques used to provide the fluid-tight barrier include mechanical polishing, grinding or media blasting. Yet alternatively, a fluid-tight barrier is provided at the outer surface with a different technique, such as impregnation with a resin or coating. This outer surface of the homogeneous porous body adjacent the mould cavities is not affected by the milling step. However, if the entire body is subjected to limited electropolishing, this outer surface will also be polished. In such cases it is important to deform a relatively thick layer which is not removed during subsequent electropolishing.

According to the present invention, the rotary cylindrical mould member comprises one or more air channels, extending from an air inlet, adapted to provide communication between the air inlet via the air channel and via the porous structure of the mould body to a deformed mould cavity surface layer and into the mould cavities, which fluid is at least compressed air to assist in the removal of product from a mould cavity. Accordingly, a fluid, such as pressurized air or a cleaning liquid, can be provided to from the passage port via the passage to the porous structure, advantageously close to the mould cavity. It is conceivable that the air channels are formed in the mould body. It is also possible that the air channels are formed in a support surface, adjacent which the mould body is positioned.

BRIEF DESCRIPTION OF THE DRAWINGS

The invention is further elucidated in relation to the attached drawings, wherein.

DETAILED DESCRIPTION OF EMBODIMENTS

Figure 1:
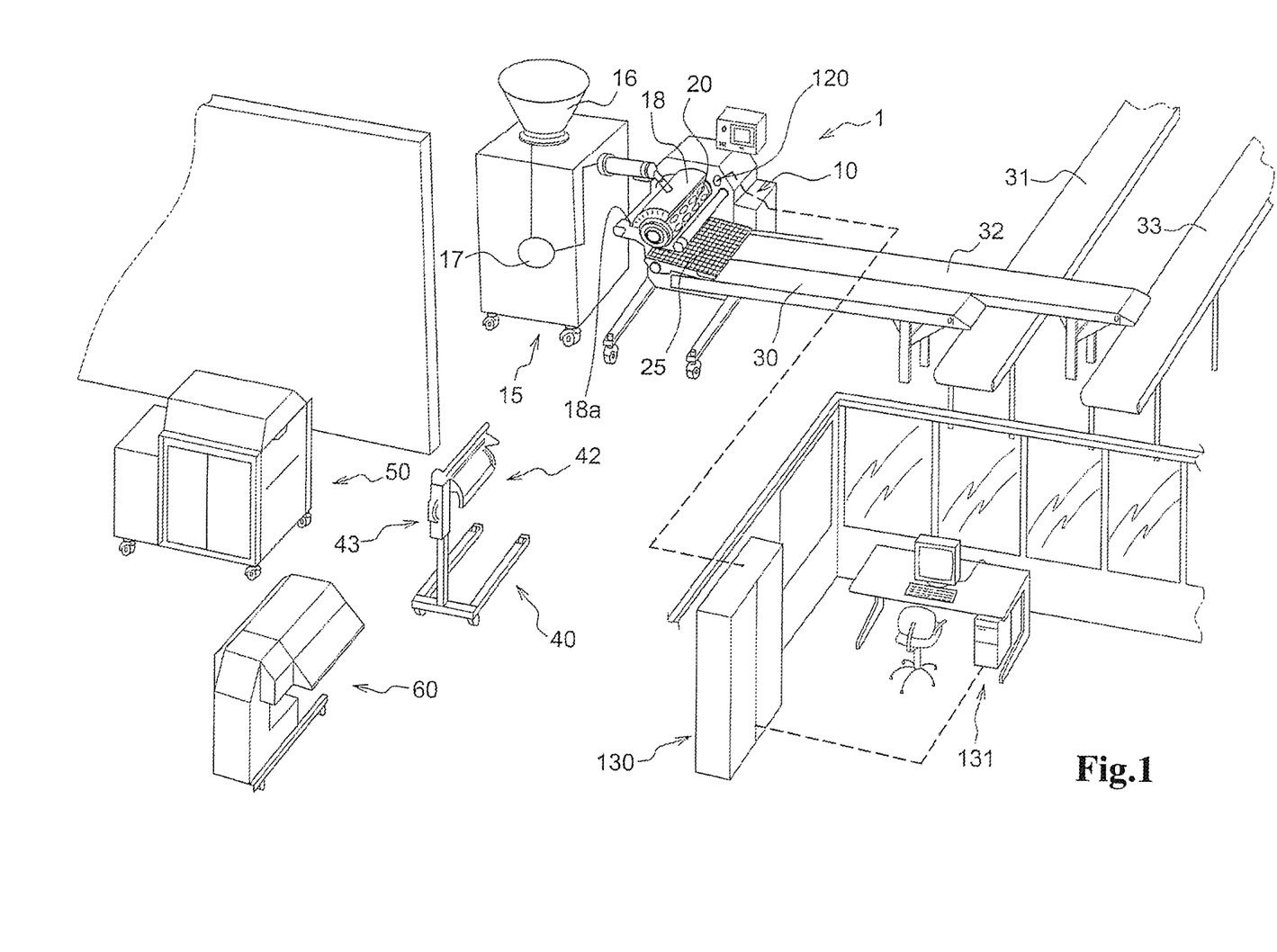
FIG. 1 shows in a diagrammatically perspective view an embodiment of a system for moulding including a production device, according to the invention.

In FIG. 1, a production device 1 is shown for moulding products from a mass of one or more food starting materials, in particular which are suitable for consumption, e.g. a meat mass. Such a production device is described in detail in WO 2004/002229, the contents of which are hereby deemed to be incorporated in the present application. The production device shown is only an example aimed at explaining the invention. The invention can also be realized using production devices of different designs, for example as shown in WO 00/30458.

In the production device 1, use is made of a cylindrical mould member 20 according to the present invention. The mould member 20 has a peripheral cylindrical outer surface in which multiple recessed mould cavities 21 are formed, as will be explained in more detail below.

The production device 1 comprises a frame 10 that is adapted to support the mould member, in this case a frame 10 which can be moved over the floor. The frame 10 as shown is provided with a horizontal mould member fitting spindle 11, so that the mould member 20 is rotatable with respect to the frame 10 about the spindle 11. In an embodiment which is not shown, the frame may have a plurality of mould member fitting spindles, or the frame comprises other support means for supporting the mould member rotatably with respect to the frame. At one end, the fitting spindle 11 is fixed to the frame 10, so that the mould member 20 can be pushed onto the fitting spindle 11. Advantageously, as in the shown embodiment, the mould member is removable from the frame, here via the free end of the spindle. Possibly, the spindle is made of plastic material, preferably UHMW-PE or PTFE, or another material, in particular metal, e.g. stainless steel.

Furthermore, the frame 10 is provided with a drive 14 for rotating the mould member 20 that is rotatable supported by the frame 10 via spindle 11.

Furthermore, the shown production device 1 has a mass feed part 15, which is likewise designed such that it can be moved over the floor, and is provided with a container 16 for receiving said mass of food starting materials, in this example a (kneaded) meat mass, e.g. chicken or red meat, a pump 17 (illustrated highly diagrammatically) connected to the container for pumping the mass, and a mass feed member 18 connected to the pump 17. At a mass feed position, the mass feed member 18 is allowed to bear against the cylindrical outer surface of the mould member 20. In operation of the production device 1 the drive 14 drives the mould member 20 that is supported by the frame 10 so that the one or more openings of the mould cavities 21 pass the mass feed member 18 and the pump 17 feeds the mass of one or more food starting materials via the mass feed member 18 and the one or more passing openings into the one or more mould cavities 21 of the rotating mould member 20 under a filling pressure, thereby forming a product in each mould cavity. In this example, the mass feed member 18 is supported pivotably by means of a support spindle 18a on the frame 10.

Here, the frame 10 is also provided with a discharge member 25 for discharging the moulded products, in this case in the form of a (mesh) belt conveyor 25 which extends as far as beneath the mould member 2, so that products which have been ejected from the mould cavities 21 in the region of the underside of the belt pass onto the said belt conveyor 25.

The system comprises further product conveyor means, in this case two sets of belt conveyors 30, 31 and 32, 33, for discharging moulded products, if appropriate to further product treatment devices.

In the shown embodiment, as indicated above, the mould member 20 is removable. For this purpose, in FIGS. 1-2 a mould member conveyor 40 is provided. This conveyor 40, shown by way of example, has a movable frame 41, a mould member gripper 42 and lifting means 43 for moving the gripper 42 up and down.

Figure 2:
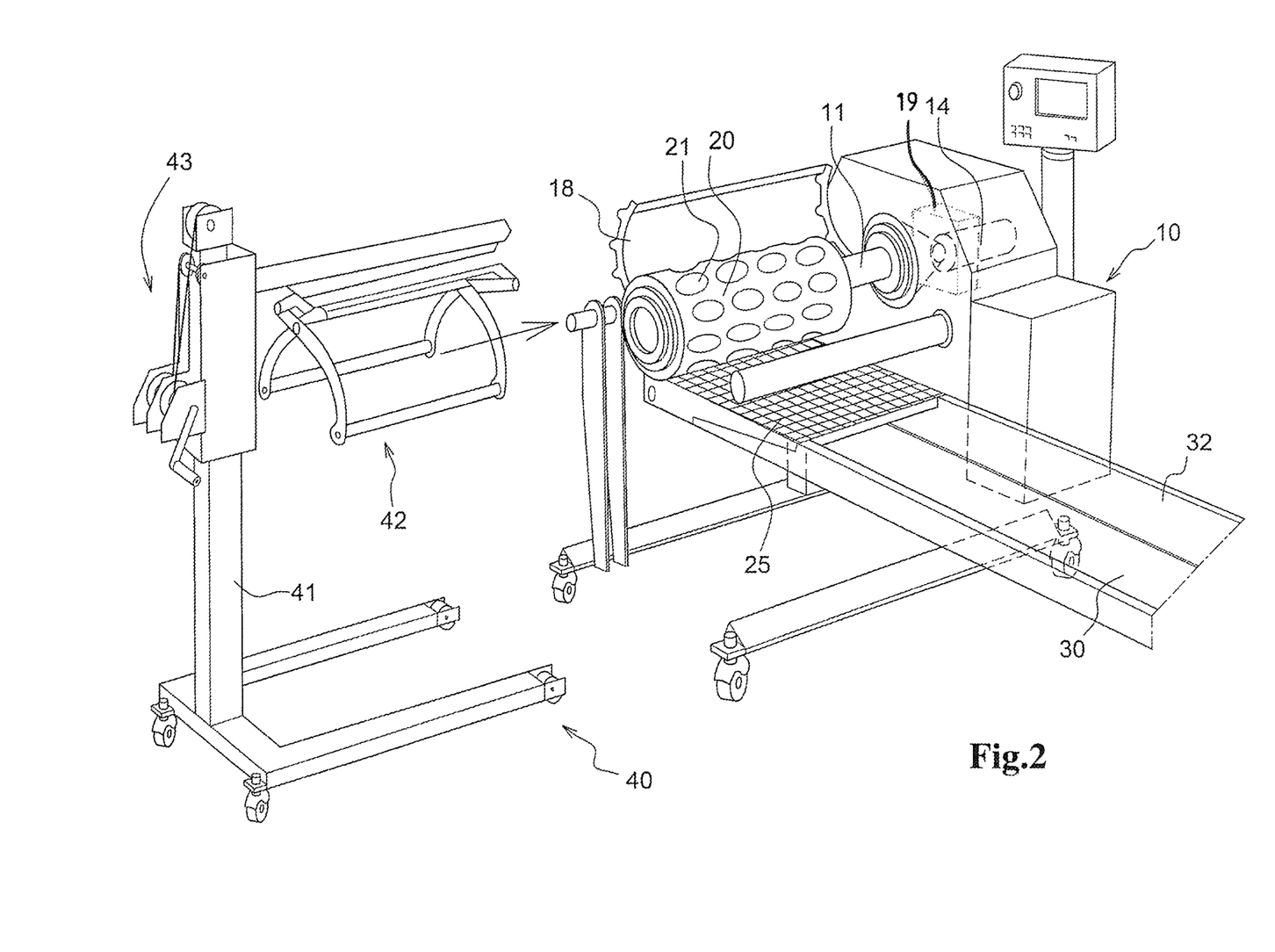
FIG. 2 depicts in a diagrammatically perspective view a part of the production device with mould member, and conveyor means for the mould member of FIG. 1.

It can be seen from FIG. 2 that after the mass feed member 18 has been moved away from the mould member 20, the conveyor 40 can be moved towards the frame 10, so that the gripper 42 can handle the mould member 20. Then, the gripper 42 is moved to the correct height, so that it bears the weight of the mould member 20 and the mould member 20 is slid off the spindle 11. Then, the mould member 20 can be displaced to a mould member cleaning device 50, which is disposed at a distance from the production device 1. It should be noted that there is no need to provide a fixed arrangement, but rather, as can be seen, the cleaning device 50 is likewise of movable design. However, it is preferable for the cleaning work to be carried out at a different location from the production of foodstuffs.

The shown system further comprises a second cleaning device 60, which is designed to clean that part of the production device 1 which bears the mould member 20, in particular after the said mould member 20 has been removed. That part of the production device 1, after all, also becomes soiled during production.

In the shown system, the production device 1 is furthermore provided with a reader 120 for preferably automatically recognizing a mould member 20, in particular an identification of a mould member 20, e.g. a transponder which is arranged at a suitable location, for example at an head-end face, on the mould member 20. This reader 120 is connected to a control device 130 of the system, which in this case has an associated computer 131. A history of the use and cleaning of the mould member 20 is stored for each mould member 20 in the memory of the computer 131. Partially on this basis, it is possible to determine the instant at which a mould member 20 has to be cleaned, and if appropriate by what cleaning process. For example, the cleaning process can be matched to the type of mould member, and the way in which each mould member is cleaned can be determined separately.

Figure 3:
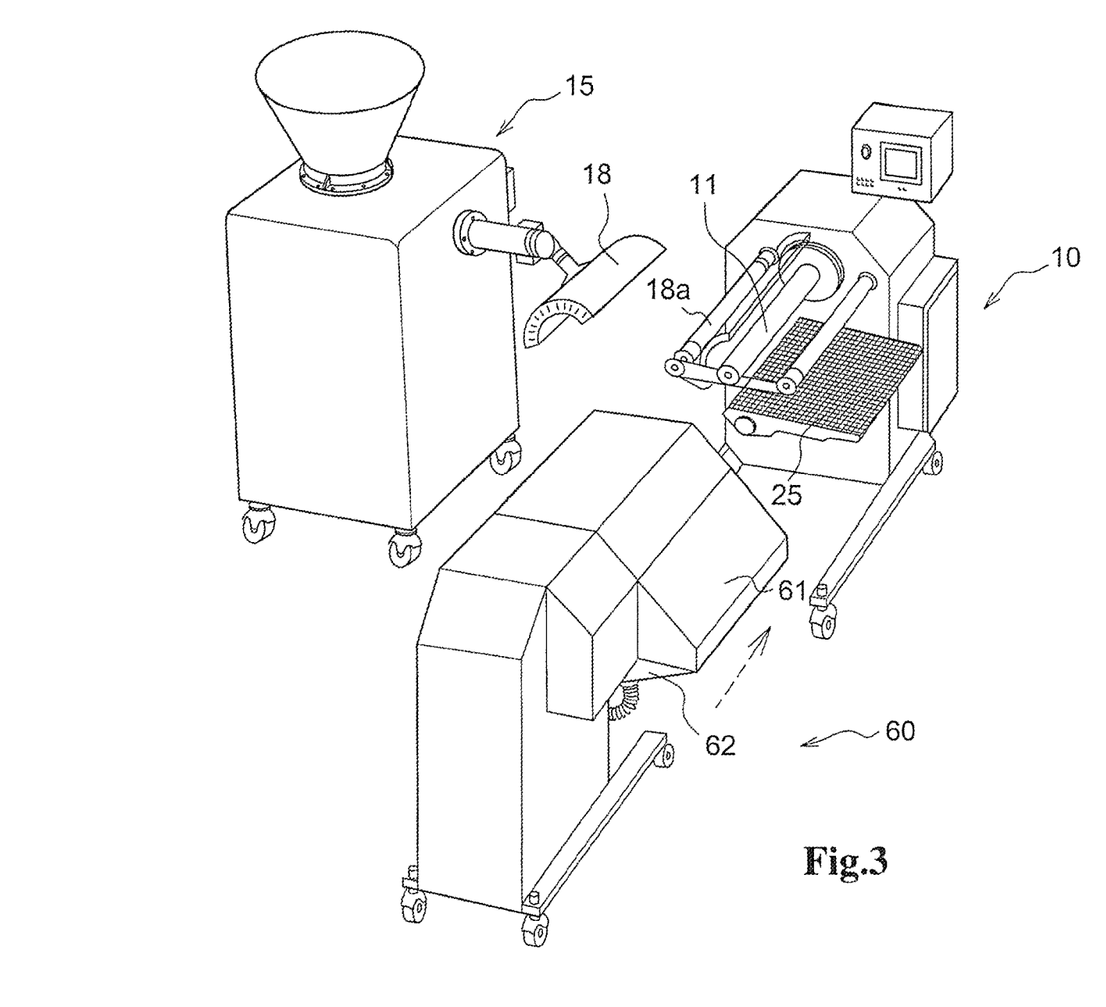
FIG. 3 depicts in a diagrammatically perspective view the production device and an associated cleaning device from FIG. 1.
Figure 5:
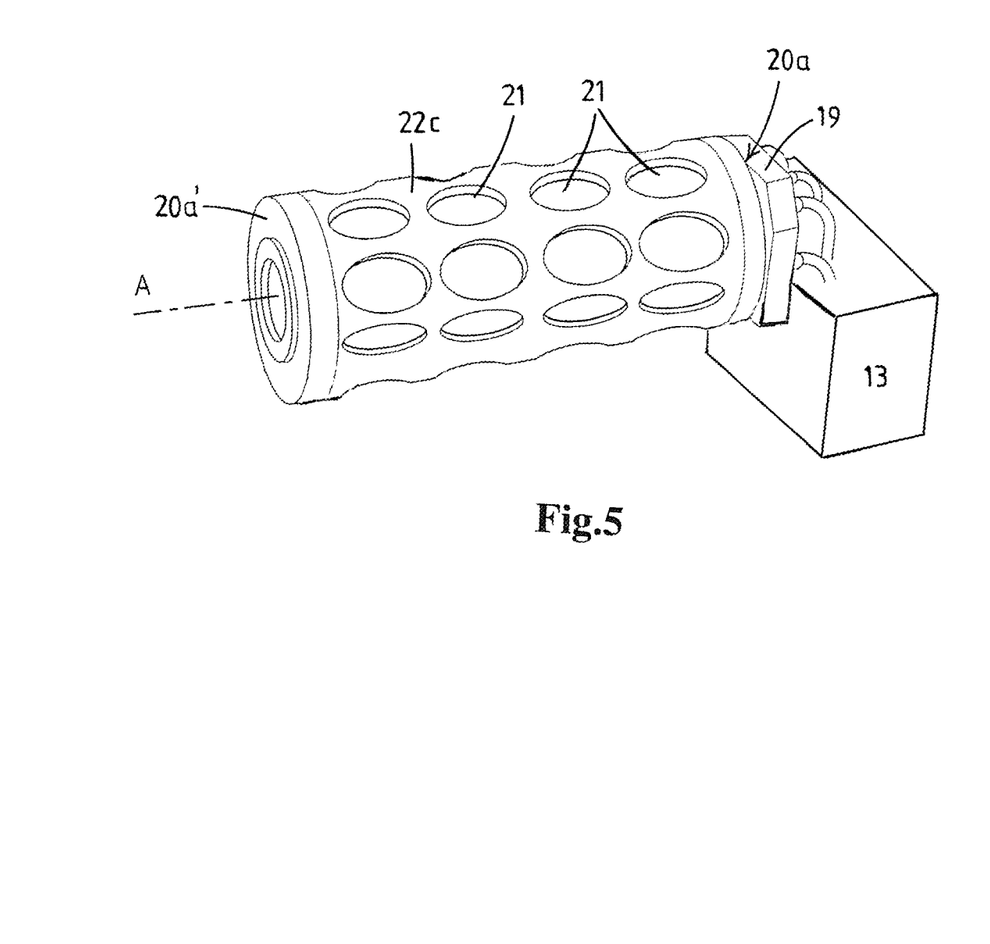

In the embodiment shown in FIGS. 3 and 5, a an air forcing device 13, at least suitable for supplying air, such as compressed air, is arranged in the vicinity of the mould member drive means 14. The shown air forcing device 13 which is known per se is provided with a pump and slots through which the forcing agent can flow. An air supply member 19 is connected to the air forcing device 13, and is adapted to bear against an end face of the mould member 20 from which one or more air channels 24 extend.

Figures 4A, 4B:
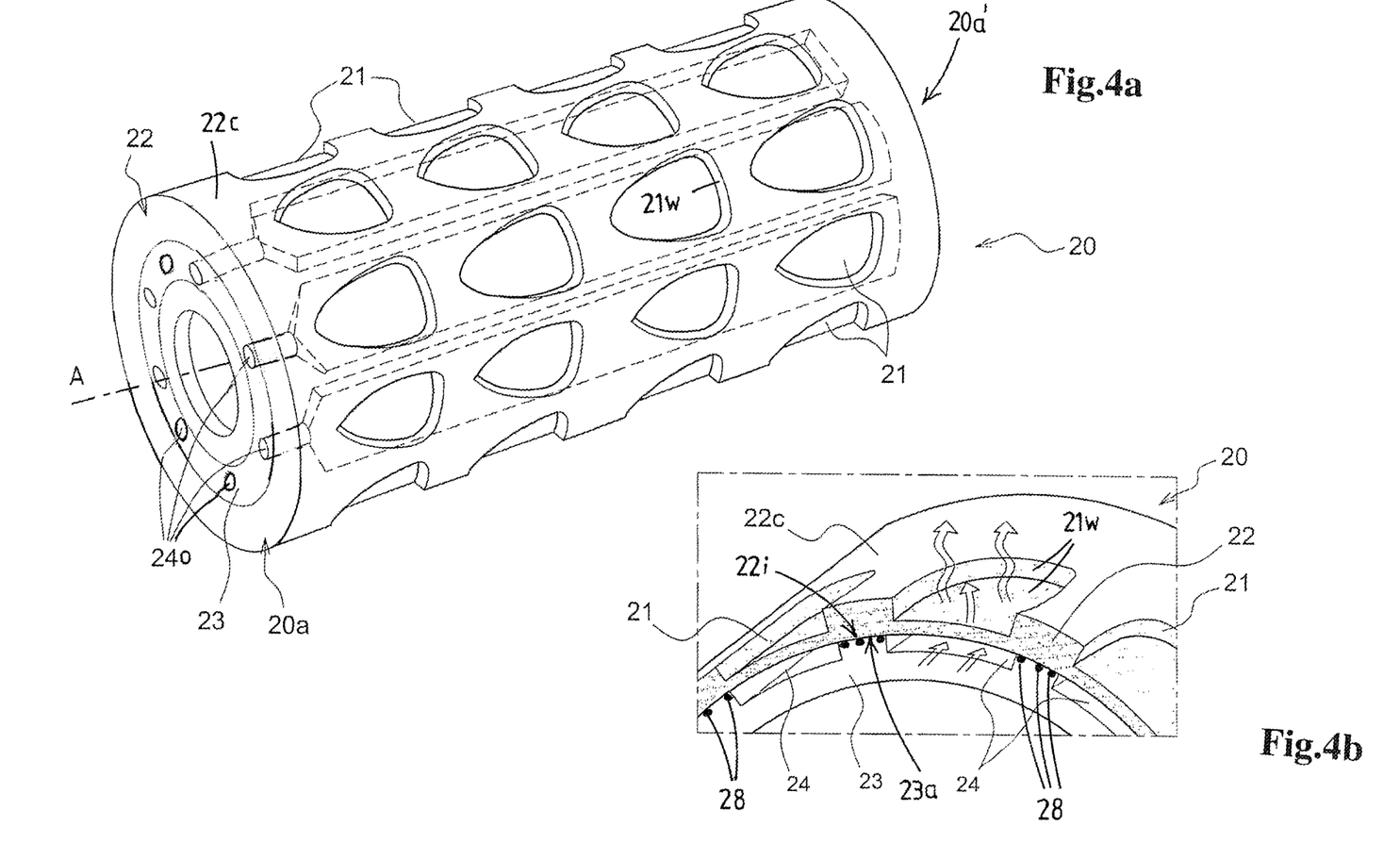
FIG. 4a shows in a schematic perspective view a first embodiment of a mould member according to the invention.
FIG. 4b shows a cross section through a part of the mould member of FIG. 4a, FIG. 5 depicts in a diagrammatically perspective view a part of the production device with mould member of FIG. 2.

In operation of the production device 1 the drive 14 drives the mould member 20 that is supported by the frame 10 so that the one or more air inlets 240 of the air channels 24 in the head end 20a of the mould member pass the air supply member 19 and the air forcing device 13 forces air via the air supply member and the air channels and via the porous structure of an inner volume of the porous mould body between the air channel and the airflow-resistive skin layer into the mould cavities to assist in the removal of product from a mould cavity;

It can be seen from FIGS. 4a, 5 that the cylindrical mould member 20 adapted to be used in a system as shown in FIGS. 1-3 has a longitudinal axis A, a peripheral cylindrical outer surface 22c and two axial mould member end faces 20a, 20a'.

The shown embodiment of mould member 20 comprises a porous mould body 22 and support member 23. Mould body 22 is formed as a hollow cylinder wall, having a curved outer surface, here forming the cylindrical outer surface 22c of the mould member 20 and an opposite inner surface 22i (FIG. 4b). The mould body 22 is made from a homogeneous porous material, with a porous structure of intercommunicating pores opening out at the inner surface of the body, and wherein the cylindrical outer surface 22c is sealed airtight.

One or more recessed mould cavities 21 are formed in the outer curved outer surface 22c of the mould body 22, defining the shape of the products which are to be produced, the mould cavities 21 being open in the outer surface 22c of the mould body 22 to allow for the filling of the mould cavity 21 with said mass of one or more food starting materials.

According to the present invention, an airflow-resistive skin layer 21w formed by plastic deformation of said porous material defines the mould cavity, here at its bottom and sidewalls. The porous structure of the inner volume of the porous mould body has a second flow resistance to a compressed air flow through the porous inner volume, which is essentially the same as the first flow resistance to a compressed air flow through the airflow-resistive skin layer.

Inside the mould body 22 there is positioned a support member 23, formed by a cylinder, which fits into the hollow cylindrical mould body 22. The support member 23 is made from a non-porous material, and has a support surface 23a (FIG. 4b), supporting the adjoining inner surface 22i of the mould body 22.

The support member 23 and the mould body 22 are secured to each other, e.g. by providing energy to rods 28, as a result of which the metal rods 28 emit heat and thereby locally melted the adjacent porous material of the mould body 22 and the material of the support member. Thus, a weld was obtained and thereby the support member 23 and the mould body 22 were secured to each other.

Support member 23 defines multiple air channels 24, recessed in the support surface 23a, extending from an air inlet 24o at mould member end face 20a, adapted to provide fluid communication between the air inlet 24o via the fluid channel 24 and via the pores opening out at the inner surface 22i of the mould body 22 and via the porous structure of an inner volume of the porous mould body 22 between the air channel and the airflow-resistive skin layer and via the airflow-resistive skin layer 21w into the mould cavities, so that air can be forced through the airflow-resistive skin layer 21w to assist in the removal of product from a mould cavity;

In the shown embodiment, the air channels thus extend from one head end 20a of the mould member 20, so that air can be forced via the air channel 24 and via the inner volume 22 and the airflow-resistive skin layer 21w into the mould cavities to assist in the removal of product from a mould cavity. It is also conceivable that suction takes place via an air channel 24 of this type. The suction can be used to extract air during the filling operation and/or, for example, to suck a film or the like into the mould cavity. It is also conceivable that said air channel 24 is used for cleaning fluid.

It can be seen from FIG. 4b that the outer surface 23a of the support member 23 is provided with grooves which extend substantially in the axial direction and form air channels 24. It would also be possible to provide for the mould member to be supported by supporting features at both head-ends of the mould member.

Advantageously, the cleaning device 50 is designed to force at least one cleaning liquid through the airflow-resistive skin layer into the mould cavities 21. As can be seen in FIG. 4a, the air channels 24 leading to each mould cavity 21 each have an air inlet 240, i.e. a feed opening, in an end face 20a of the mould member 20. Advantageously, the cleaning device 50 has a distributor 51 which comes to bear against the head-end face 20a, for the purpose of feeding cleaning liquid to one or more of the channels 24. In this way, any possible contamination which has stuck to or in the porous inner volume 22 or the airflow-resistive skin layer 21w is forced out and discharged.

Figure 6A:
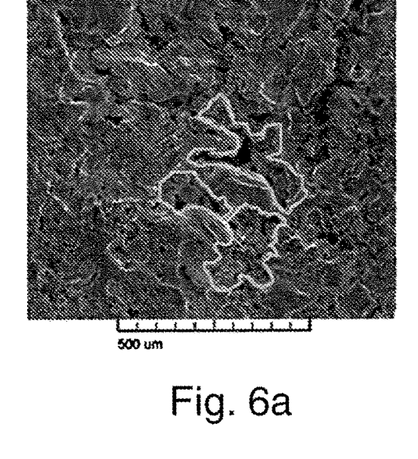
FIG. 6a shows an image of an exemplary outer surfaces of a mould body not according to the invention.
Figure 6B:
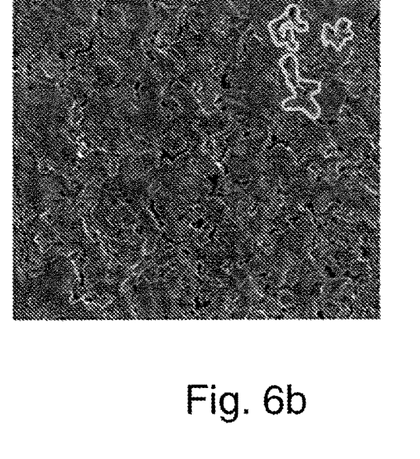
FIG. 6b shows a similar image as FIG. 6a, of an exemplary outer surfaces of a mould body according to the invention.
Figure 7A:
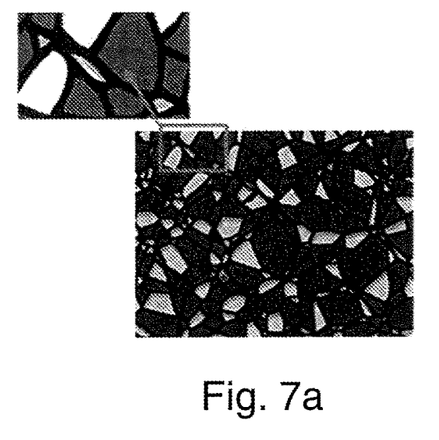
FIG. 7a is a schematical representation of an outer surface of a mould body not according to the invention.
Figure 7B:
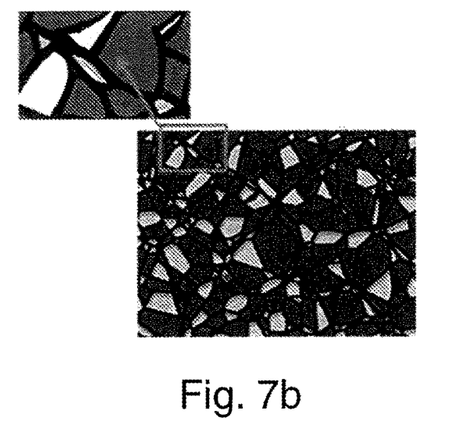
FIG. 7b is a similar schematical representation as FIG. 7a, of an outer surface of a mould body according to the invention.
Figure 8A:
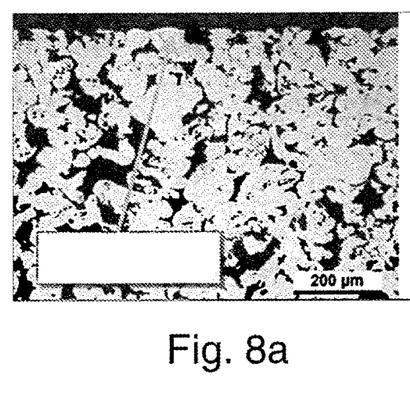
FIG. 8a is an image of a cross-sectional view including the outer surface of a mould body not according to the invention.
Figure 8B:
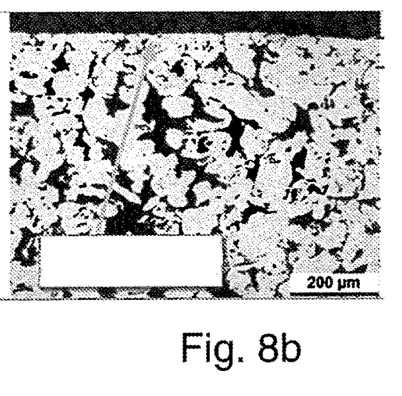
FIG. 8b is a similar image as FIG. 8a, of a cross-sectional view including the outer surface of a mould body according to the invention.

In FIGS. 6a and 6b images of exemplary outer surfaces of a mould body are shown. In FIGS. 7a and 7b schematical representations of an outer surface of a mould body are shown. In FIGS. 8a and 8b images of a cross-sectional view including the outer surface of a mould body are shown.

FIGS. 6a, 7a and 8a, at the left-hand side of the drawing, do not relate to mould bodies according to the invention. These mould bodies are of a homogeneous composition, i.e. there is no plastically deformed skin layer. The deformed porous cavity surface layer that was produced during the formation of the mould cavities of these embodiments has been removed in its entirety during a subsequent polishing step. The cavity surface area has a relatively large porosity.

In FIGS. 6b, 7b, and 8b an airflow-resistive skin layer according to the invention is visible, in the shown embodiments obtained by limited electropolishing the plastically deformed porous cavity surface layer. Fine holes result from local erosion of the thinnest cavity surface layer portions. A smooth polished remaining cavity surface area is obtained, wherein virtually all pores are closed. In FIGS. 6a and 6b, the reduced surface porosity and smooth polished remaining cavity surface area is visible, while in FIG. 8b the reduced porosity in the airflow-resistive skin layer is visible. In particular, the thickness of the airflow-resistive skin layer in this embodiment can be determined, i.e. approximately 50 µm.

Figure 9A:
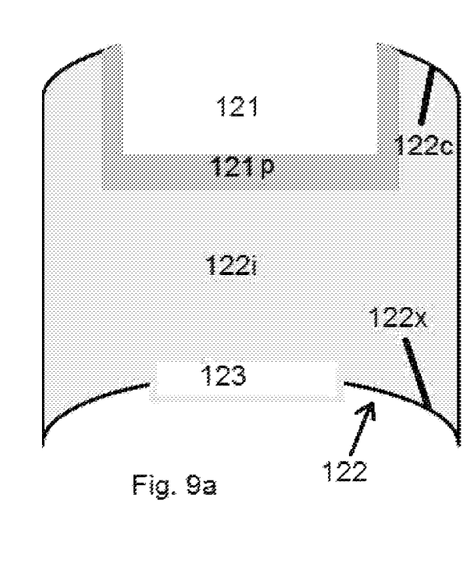
FIG. 9a is a highly schematical representation of part of a porous mould body with a mould cavity surrounded by a plastically deformed skin layer.
Figure 9B:
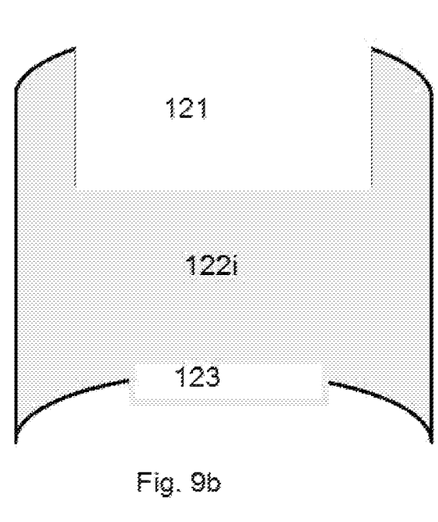
FIG. 9b represents the same mould body of FIG. 9a with the plastically deformed skin layer removed, according to the prior art.
Figure 9C:
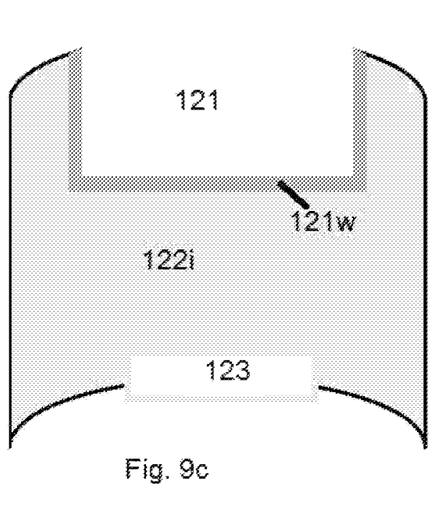
FIG. 9c represents the same mould body of FIG. 9a with the plastically deformed skin layer partially removed, according to the invention.

In FIGS. 9a, 9b and 9c part of a porous mould body 122 is shown schematically, having a curved outer surface 122c which is part of a peripheral cylindrical outer surface of a mould member. The porous mould body 122 has an opposed inner surface 122x. Air channels 123 open out at the inner surface 122x, to provide an air flow which is to pass through the porous mould body. A recessed mould cavity 121 is formed in the curved outer surface of the mould body, defining the shape of the products which are to be produced. The mould cavities 121 are open in the outer surface of the mould body to allow for the filling of the mould cavity with a mass of one or more food starting materials. The mould body 122 is at least partially made from a homogeneous porous material, with a porous structure of intercommunicating pores opening out at the inner surface of the body. It is noticed that the cylindrical outer surface 122c is intentionally sealed airtight, to prevent air from escaping through this outer surface 122c.

The porous material has a set, minimum flow resistance $\Delta P_{min}$ to a compressed air flow through the porous material, from the air channel 123 to the mould cavity 121. The material of the porous mould body is tuned to a desired, preferably minimum, flow resistance to a compressed air flow, which is determined by a required airflow to assist in the removal of product from a mould cavity.

In practice, the mould body 122 is formed from a homogeneous porous material, in which a recessed mould cavity 121 is formed. By forming the recessed mould cavity 121, a cavity surface layer of the porous material of mould body, defining the mould cavity, is plastically deformed, resulting in the configuration schematically depicted in FIG. 9a. The plastically deformed layer is labelled 121p. This plastically deformed airflow-resistive skin layer 121p has a first flow resistance to a compressed air flow, through the air-flow resistive skin layer 121p. Commonly, the openings of the pores are completely closed up, resulting in an essentially closed cavity surface layer. Accordingly, the first flow resistance $\Delta P_1$ is very large to infinite.

In the production stage shown in FIG. 9a, the inner volume 122i of the mould body 122 is formed from a homogeneous porous material having a second flow resistance $\Delta P_2$ to a compressed air flow as desired, hence, $\Delta P_2$ corresponds to $\Delta P_{min}$. The plastically deformed layer 121p has a very large to possibly infinite first flow resistance to a compressed air flow. Hence, $\Delta P_1$ has a maximum value $\Delta P_{max}$.

Accordingly, the overall flow resistance for air flow from the air channels 123 to the mould cavity 121 $\Delta P_{overall}$ is very large, as it is mainly determined by the first very large to infinite flow resistance $\Delta P_1$ of layer 121p, and there will be insufficient air flow to assist in the removal of product from the mould cavity.

In the prior art, this plastically deformed layer 121p is removed in its entirety, as depicted in FIG. 9b. In this configuration there is no first flow resistance $\Delta P_1$, as there is no skin layer 121p.

Now, the mould body has and overall flow resistance $\Delta P_{overall}$ from the air channels 123 to the mould cavity 121 which is only determined by the second flow resistance $\Delta P_2$ of the inner volume 122*i*, which was tuned to the desired flow resistance $\Delta P_{min}$ to a compressed air flow.

In other words, the overall air flow resistance from the air channels to the mould cavity is very large after forming the cavities, as shown in FIG. 9*a*. There will be insufficient air flow to assist in the removal of product from the mould cavity. According to the prior art, as shown in FIG. 9*b*, the plastically deformed layer is removed, resulting in an overall air flow resistance having a minimum value, $\Delta P_{min}$, which is sufficient to assist in the removal of product from the mould cavity.

According to the present invention, as depicted in FIG. 9*c*, there is a plastically deformed cavity surface layer 121*w* of the porous material of mould body, which is plastically deformed during the forming the recessed mould cavity 121. This plastically deformed airflow-resistive skin layer 121*w* differs from the plastically deformed layer 121*p* of the situation in FIG. 9*a* in that the pores are not entirely closed up, and hence, the first flow resistance $\Delta P_1$ of layer 121*w* is not as large (or even infinite) as that of the layer 121*p*.

In particular, the airflow-resistive skin layer 121*w* according to the present invention has a first flow resistance $\Delta P_1$ to a compressed air flow through the airflow-resistive skin layer which is essentially the same as the second flow resistance $\Delta P_2$. As this second flow resistance $\Delta P_2$ was set to a desired, minimum flow resistance $\Delta P_{min}$, the second flow resistance $\Delta P_2$ is essentially the same.

Hence, the overall flow resistance $\Delta P_{overall}$ of the mould body for air flow from the air channels 123 to the mould cavity 121 is determined by the sum of first flow resistance $\Delta P_1$ of layer 121*w*, and second flow resistance $\Delta P_2$ of the inner volume 122*i*, which was tuned to the desired flow resistance $\Delta P_{min}$ to a compressed air flow. Hence, $\Delta P_{overall}$ essentially corresponds to $2 \times \Delta P_{min}$.

In other words, the overall air flow resistance from the air channels to the mould cavity after forming the cavities according to the present invention, is essentially twice as large as the air flow resistance of a porous mould member without airflow-resistive skin layer. It has been found that this overall air flow resistance is sufficient and advantageous to assist in the removal of product from the mould cavity.

It is conceivable that the airflow-resistive skin layer of the invention, i.e. the configuration of FIG. 9*c*, is obtained in a single step, during the forming of the mould cavities. Generally, the airflow-resistive skin layer of the invention is obtained in a two-step process, comprising a machining step such as milling or spark erosion, resulting in the configuration of FIG. 9*a*, followed by a polishing step such as plasmapolishing or electrochemical polishing, to obtain the configuration of FIG. 9*c*.

The invention claimed is:

1. A rotary cylindrical mould member, which is adapted to be used in a system for moulding products from a mass of one or more food starting materials, the cylindrical mould member having a longitudinal axis and a peripheral cylindrical outer surface, comprising at least one porous mould body having a curved outer surface, forming at least part of the cylindrical outer surface of the mould member, and an opposite inner surface, which mould body is made at least partially from a homogeneous porous material, with a porous structure of intercommunicating pores opening out at the inner surface of the mould body, the porous mould body comprising:
    a curved outer surface, which is sealed airtight;
    one or more recessed mould cavities foamed in the curved outer surface of the mould body, defining the shape of the products which are to be produced, the mould cavities being open in the outer surface of the mould body to allow for the filling of the mould cavity with a mass of one or more food starting materials;
    an airflow-resistive skin layer formed by plastic deformation of a cavity surface layer defining the mould cavity, having a first flow resistance to a compressed air flow through the airflow-resistive skin layer; and
    an inner volume of the porous mould body between the inner surface and the airflow-resistive skin layer having a porous structure with a second flow resistance to a compressed air flow through the porous inner volume,
    wherein the rotary cylindrical mould member further comprises one or more air channels extending from an air inlet, adapted to provide communication from the air inlet via the air channel and via the inner volume and the airflow-resistive skin layer into the mould cavities to assist in the removal of product from a mould cavity, and
    wherein the first flow resistance is essentially the same as the second flow resistance.

2. The rotary cylindrical mould member according to claim 1, wherein the airflow-resistive skin layer has a thickness of 10-200 μm and an inner volume of 3-20 mm.

3. The rotary cylindrical mould member according to claim 1, wherein the porous mould body is embodied as an insert, which is adapted to be inserted into a recess of a cylindrical tubular support.

4. The rotary cylindrical mould member according to claim 1, wherein the porous mould body is a cylindrical tubular, and wherein multiple recessed mould cavities are provided in the outer surface.

5. The rotary cylindrical mould member according to claim 4, wherein fluid-tight barriers are provided between one or more mould cavities.

6. The rotary cylindrical mould member according to claim 1, the airflow-resistive skin layer has fine holes which open out in 1-10% of a cavity surface area and have an average hole diameter of 10-100 μm, and none of the holes having a hole diameter exceeding 200 μm, and a smooth polished remaining surface wherein virtually all pores are closed.

7. The rotary cylindrical mould member according to claim 1, wherein the airflow-resistive skin layer has fine holes which open out in 1-10% of a cavity surface area and have a hole diameter in the range of 1-200 μm, and with an average hole diameter of 100 μm.

8. A method for manufacturing a rotary cylindrical mould member, which is adapted to be used in a system for moulding products from a mass of one or more food starting materials, the cylindrical mould member having a longitudinal axis and a peripheral cylindrical outer surface, the method of manufacturing comprising the steps of:
    providing at least one porous mould body having a curved outer surface, forming at least part of the cylindrical outer surface of the mould member, and an opposite inner surface, which mould body is made at least partially from a homogeneous porous material, with a porous structure of intercommunicating pores opening out at the inner surface of the mould body;
    sealing the curved outer surface of the body airtight;
    forming one or more recessed mould cavities in the curved outer surface of the mould body, defining the shape of the products which are to be produced, the mould cavities being open in the outer surface of the mould body to allow for the filling of the mould cavity with a mass of one or more food starting materials, thereby plastically deforming a cavity surface layer defining the mould cavity, so as to produce an airflow-resistive skin layer, having a first flow resistance to a compressed air flow through the airflow-resistive skin layer, and thereby defining an inner volume of the porous mould body between the inner surface and the airflow-resistive skin layer having a porous structure with a second flow resistance to a compressed air flow through the porous inner volume; and preparing one or more air channels, extending from an air inlet, adapted to provide communication from the air inlet via the air channel and via inner volume of the porous mould body between the air channel and the airflow-resistive skin layer into the mould cavities to assist in the removal of product from a mould cavity, wherein the first flow resistance is essentially the same as the second flow resistance.

9. The method according to claim 8, wherein the porous mould body comprises sintered metal, and wherein the one or more recessed mould cavities are formed in a milling step using a milling cutter, so as to cause smearing of the sintered metal cavity surface layer, forming an irregular thickness smeared cavity surface layer adjacent the mould cavity having an irregular thickness of 10-200 μm wherein substantially all pores are closed, followed by limited electrochemical polishing, so as to remove only minute regions of the irregular thickness smeared cavity surface layer and thereby form the airflow-resistive skin layer having fine holes resulting from local erosion of the thinnest cavity surface layer portions, and a smooth polished remaining cavity surface area wherein virtually all pores are closed.

10. The method according to claim 9, wherein the porous mould body comprises sintered metal, having an average pore size of 1-20 μm, and 3-25 vol % porosity and wherein the fine holes resulting from local erosion of the thinnest cavity surface layer portions open out in 1-10% of a cavity surface area and have an average hole diameter of 10-100 μm, and none of the holes having a hole diameter exceeding 200 μm.

11. The method according to claim 9, wherein the porous mould body comprises sintered metal, having an average pore size of 1-20 μm, and 3-25 vol % porosity and wherein the fine holes resulting from local erosion of the thinnest cavity surface layer portions open out in 1-10% of a cavity surface area and have a hole diameter in the range of 1-200 μm, and with an average hole diameter of 100 μm.

12. The method according to claim 8, wherein the one or more recessed mould cavities are formed in a milling step using an end mill.

13. The method according to claim 8, further comprising the step of providing fluid-tight barriers between one or more mould cavities.

* * * * *